United States Patent [19]
Schmidt et al.

[11] 3,890,781
[45] June 24, 1975

[54] FLUID COOLED COMBUSTION CHAMBER CONSTRUCTION

[76] Inventors: Günther Schmidt, Asteinweig 21, 8012 Ottobrunn-Riemerling; Armin Theiss, Neusatzerstrasse 6a, 8 Munich 82; Dederra, Carl-Helmut, Mozartstrasse 87a, 8012 Ottobrunn; Leonhard Kaiser, Kemptener Strasse 60, 8 Munich 49, all of Germany

[22] Filed: Apr. 4, 1969

[21] Appl. No.: 813,677

[30] Foreign Application Priority Data
Apr. 18, 1968 Germany............................ 1751180

[52] U.S. Cl................ 60/267; 60/39.66; 239/127.1
[51] Int. Cl............................................ F02k 11/02
[58] Field of Search................... 60/260, 267, 39.66; 29/157 C; 239/127.1

[56] References Cited
UNITED STATES PATENTS

| | | | |
|---|---|---|---|
| 2,686,400 | 8/1954 | Andrus | 60/260 |
| 2,951,336 | 9/1960 | Mueller | 60/260 |
| 2,956,399 | 10/1960 | Beighley | 60/39.66 X |
| 2,968,918 | 1/1961 | Denison | 60/260 |

*Primary Examiner*—Douglas Hart

[57] ABSTRACT

A construction for connecting a plurality of longitudinally extending and circumferentially spaced ducts defined in a wall of a combustion chamber such as a rocket engine nozzle section includes an annular hollow member or ring having a flat connecting wall which is adapted to be abutted against a similar flat wall of the combustion chamber wall to which it is to be associated. The annular member includes an opening for receiving a connecting conduit but before the connecting conduit is applied, one or more bores defined in the annular member and communicating with the interior thereof are aligned with corresponding connecting bores defined in the combustion chamber receiving wall to which the device is to be connected. The connecting bores in the securing wall are provided with steps at the location of the junction of an outer bore of large diameter which corresponds to the diameter of the bores of the annular member and an inner bore of small diameter. After the bores are aligned, tubular connecting elements are inserted through the bores of the annular member and into the bores of the receiving member to engage on the steps. The cooling ducts in the wall of the receiving member are initially formed by filling an inner wall portion with filling material in the outline of the ducts and then forming the outer wall portion thereover and removing the filling material by melting. After the connecting tubes are positioned between the annular member and the receiving member the abutting flat surfaces of the annular member and the receiving member are connected together by applying a solder to the outer abutting walls along a widened joint portion formed by a notch in the outer annular member. The two parts are then advantageously heated so the solder flows across the entire abutting joint surface between the annular member and the receiving member. Thereafter, the connecting tube is applied to the annular member and suitably secured and sealed in position such as by welding or by soldering.

6 Claims, 1 Drawing Figure

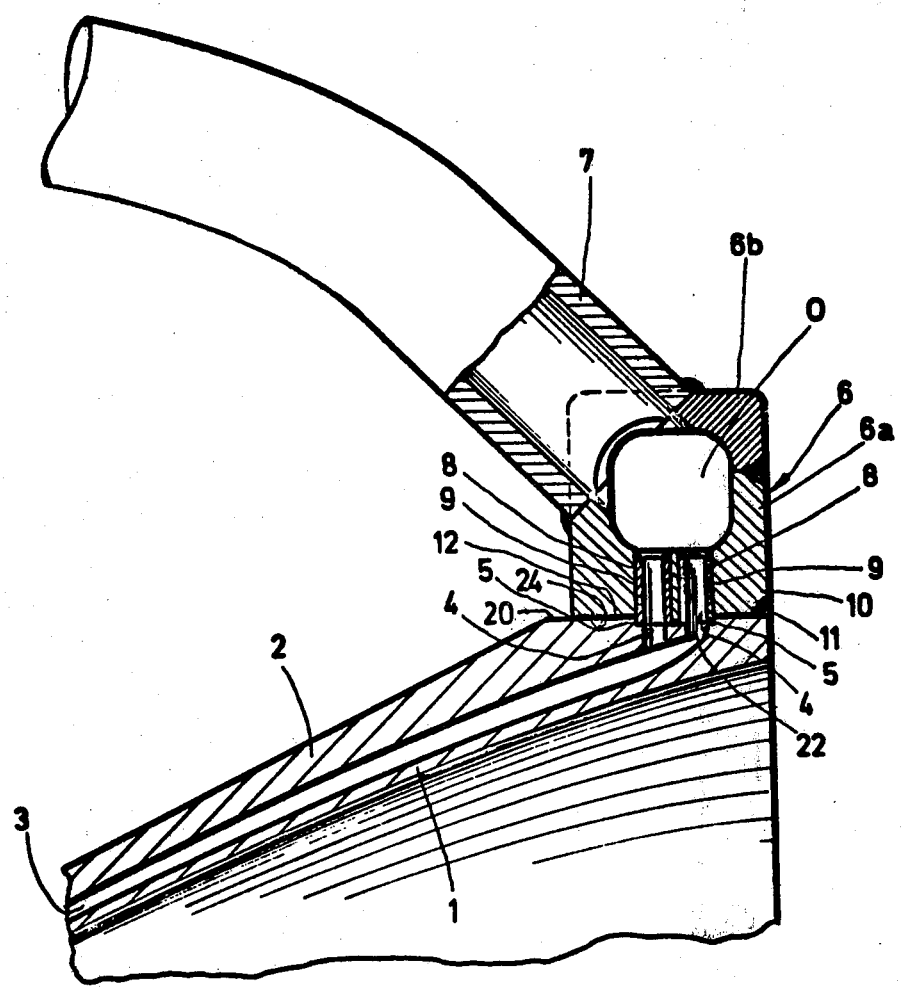

FLUID COOLED COMBUSTION CHAMBER CONSTRUCTION

SUMMARY OF THE INVENTION

This invention relates in general to the construction of combustion chambers and in particular, to a new and useful method and construction of a combustion chamber particularly of a rocket engine which includes a collecting or distributing ring for interconnecting a plurality of conduits such as for cooling or fuel distribution purposes.

The present invention is particularly applicable to the construction of liquid fueled rocket engines wherein a propellant component or a coolant is directed through ducts defined in the walls of the combustion chamber in order to provide an adequate cooling therefor. For example, in U.S. Pat. No. 2,968,918, there is shown a feed ring and collecting ring construction for one of two propellant components which is secured on the outer wall of the thrust nozzle of the combustion chamber by welding. The connection between the feed ring or collecting ring to or from the various cooling ducts extending through the thrust nozzle or combustion chamber walls is effected through bores in the outer wall of the thrust nozzle or combustion chamber.

Combustion chambers and thrust nozzles for rocket engines which are propelled by liquid propellants are subject to high thermal stresses in addition to high compressive stresses. In order to control the great amounts of heat which are generated the combustion chambers and the thrust nozzles are frequently made of a copper or a copper alloy material since such materials have terminal conductivity which facilitates the elimination of the heat by the cooling system provided. On the other hand copper has a relatively low mechanical strain characteristic particularly at high operating temperature. With those liquid fueled rocket engines having a specific output it is necessary to work with very high pressures of the propellent components and there must also be great pressure differences in the various regions of the combustion chamber and the thrust nozzle. Thus there is a maximum pressure difference between the pressure of the propellant component conveyed by the feed ring and the low pressure of the propellent gases flowing at the interior of the combustion chamber against the thrust nozzle wall and which tend to condense on the wall as they flow thereby. A deformation of the respective plane of the thrust nozzle wall, however, leads to a break up of the welded joints between the ring flanges of the feed ring and the thrust nozzle wall. The same problems appear in respect to the operating range of the collecting ring. But at this location also there is a pressure difference between the combustion chamber pressure and the outflowing propellant component pressures, the propellant component pressure exceeding the combustion chamber pressure by at least the relative injection pressure setting. In a propellant system having a return nozzle the pressure necessary for conveying the propellant must be added to the pressure differentials which already exist. A reduction of the forces acting on the combustion chamber and the thrust nozzle wall by reducing the cross sections of the feed ring and the collecting ring is not possible, because in order to reduce the flow resistance, the uniform distribution of the coolant over the individual coolant ducts arranged around the nozzle circumference requires a sufficient ring cross section.

In accordance with the present invention, the disadvantages of the known embodiments are overcome by providing a construction of feed or collecting ring which operates satisfactorily even under extreme operating conditions and which may be employed even when the combustion chamber and the thrust nozzle are made of a relatively soft material such as a highly conductive copper.

In accordance with the feature of the invention the collecting ring is made of a structurally strong material such as a steel of great strength and which may advantageously be formed of a rectangular closed cross sectional form. The ring advantageously includes a flat wall which may be abutted against a similar flat wall formed around the circumference of the portion to which it is to be joined. The annular member advantageously includes one or more bores which may be aligned with bores of the receiving part of the combustion chamber, the bores being formed of a size to receive connecting tubes which are inserted through the openings of the annular member into the receiving bores of the receiving member of the combustion chamber wall portion. The construction has the general advantage that the feed ring or collecting ring because of its closed cross sectional form is not only capable of adsorbing by itself the pressure acting on it from its interior but it also provides a means for strengthening the combustion chamber particularly in the area of the discharge of the thrust nozzle of the combustion chamber, and this becomes very necessary when the material of the combustion chamber wall is a soft material.

In accordance with a further feature of the inventive construction, the feed ring or collecting ring is divided into an inner radial portion and an outer radial portion which fit together into the closed configuration. This permits the drilling of the connecting bores from the annular member to the receiving portion of the combustion chamber to connect into the associated ducts thereof by drilling radially inwardly from the outside. This arrangement also permits the connection of the cooling ducts of the combustion chamber to the ring by inserting connecting tubes through the bores which are drilled to engage into the associated bores of each cooling duct of the receiving part of the combustion chamber. In addition, it facilitates the connecting of the ring to the combustion chamber outer wall by applying solder through an annular joint formed in the annular duct.

In accordance with a further aspect of the invention, the bores of the annular duct or feed ring are connected by connecting tubes which fit into the bores with a clearance and which are later tightly connected between the parts by calking or press fitting, for example. The measures ensure a safe larger surface soldered joint between the inner ring portion and the outer wall of the thrust nozzle member because it permits the use of excess solder without running the risk that the connecting bores between the individual cooling ducts and the interior of the feed ring or collecting ring will be at least partly clogged by the excess solder. In those instances where the outer wall of the thrust nozzle section or the combustion chamber section is produced by electroplating after first filling the cooling ducts with a readily meltable material, the soldering of the inner ring portion of the feed ring or collecting ring can be effected after the bores have been provided in the outer wall of the thrust nozzle or combustion chamber. The filling material is melted out of the cooling ducts because it would evaporate during the soldering operation if this is not done first. It is necessary to use excess solder in order to obtain a large surface and reliable soldered joint over the entire bearing surface of the inner portion of the rings at the connection to the receiving wall of the combustion chamber or thrust nozzle.

Accordingly, it is an object of the invention to provide an improved method of joining a collecting ring or feed ring to a receiving portion of a combustion chamber portion for communicating the interior of the ring to one or more ducts within the wall of the receiving part which are spaced around its circumference, comprising arranging an annular member over the receiving part of the combustion chamber, forming one or more bores from the interior of the annular member into communication with the ducts of the receiving part, inserting connecting tubes to extend between the bores of the annular member and a portion of the connecting ducts of the receiving part, and applying solder between the annular member and the receiving part to solder these two parts together preferably with excess solder.

A further object of the invention is to provide a combustion chamber construction which includes a combustion chamber wall portion having a plurality of longitudinally extending ducts located ducts located at the circumferentially spaced locations around the interior of the walls thereof, a ring member disposed around said combustion chamber walls and having a flat interior surface abutting against the substantially flat interior surface of said combustion chamber wall, at least one bore defined through said annular member from the interior thereof to the exterior and through a portion of the combustion chamber wall into association with a respective duct, a tube located within the bore and extending from the annular member into the connection to the duct of the receiving member, and solder means holding said annular member to said receiving member.

A further object of the invention is to provide a combustion chamber construction with an annular collecting or feeding duct which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawing:

The only FIGURE of the drawing is an enlarged partial view of a thrust nozzle portion of a combustion chamber constructed in accordance with the invention.

GENERAL DESCRIPTION OF THE PREFERRED EMBODIMENT

Referring to the drawing in particular, the invention embodied therein comprises a combustion chamber of a liquid fueled rocket engine of which the nozzle portion is shown. The thrust nozzle of the combustion engine is made of a relatively soft but thermally conductive material such as copper and it comprises an inner wall 1 and an outer wall 2 between which individual cooling ducts 3 are located. The cooling ducts extend in a longitudinal direction and a plurality of such ducts are spaced around the circumference of the nozzle section.

In the forming of the nozzle thrust section and the combustion chamber itself the cooling ducts are formed such as by milling the inner piece 1. Thereafter the channels which are formed are filled with a meltable material and an outer wall 2 is formed over the inner wall by electroplating.

After the electroplating is completed bores 4 are drilled inwardly in a radial direction from a flat ended portion or ring mounting base 20 which provides a mounting base or ring base for an annular collecting duct in the form of a ring conduit or feed ring generally designated 6. In the embodiment illustrated two bores 4, 4 spaced in a longitudinal direction connect downwardly into an associated single duct 3. The bores 4 are increased in diameter in a radial direction toward the outside by countersunk step portions or enlarged diameter portion 5 which form ledges 22. The filling material contained in the cooling ducts 3 is then melted out.

In accordance with the invention the feed ring 6 is arranged around the end of the thrust nozzle section and it includes a flat base portion or ring base 24 which is adapted to be arranged over the flat portion 20, when as in this instance, the ring 6 is a feed ring provided to distribute a gaseous liquid propellant component through the individual cooling ducts 3. In accordance with the invention the ring 6 is made of an inner ring portion 6a and a radially outer ring portion 6b. One or more feed pipes 7 are connected at a plurality of spaced locations distributed around the circumference of the ring. The ring portions 6a and 6b when fitted together form a closed cross section so that the ring 6 can absorb its inner pressure load and relieve the housing of the thrust nozzle and also reinforce the housing in the manner of a bandage.

To assemble the ring 6 to the combustion chamber the inner portion 6a is first mounted on the flat base portion 20 of the thrust nozzle section. The bores 9 are then drilled through the inner portion and they are aligned with the bores 4, 4 at the end of each duct 3. Connecting tubes 8 are then inserted into the bores 9 of the ring portion 6a and they extend into the bores 4 and abut against the ledges 22 of the steps 5. The radial outer ends of the connecting tubes 8 are calked and flange fitted with the ring portions 6a at the outer rims of the bores 9. A slight play remains between the inner side of the bores and the outer shell of connecting tubes 8.

The ring portion 6a is provided with an annular gap 10 at its outer face which is filled with a solder 11 which may be, for example, in the form of a ring. The solder ring 11 is then heated, for example, in a furnace to its melting temperature and the solder penetrates by capillary action in to the common separating joint 12 between the flat wall 24 and the flat wall 20.

The provision of the connecting tubes 8 ensures that no solder can penetrate during the soldering process into the bores 4 and 9. This makes it possible to use an excess quantity of solder in order to be absolutely sure that the entire separating joint 12 becomes a large surface firm soldered joint. In addition, the excess material can flow off into the remaining clearance between the connecting tubes 8 and the bores 9. During the soldering the radial inner ends of the connecting tubes 8 are soldered at the same time into the steps 5.

What is claimed is:

1. A construction for a combustion chamber having a fluid cooled wall, comprising a combustion chamber wall having a cooling duct defined therethrough and being made of a relatively soft material, said wall having an annular ring mouting base defined on the exterior thereof overlying said duct, at least one bore defined through said wall from the exterior of said ring mounting base into said duct, and a closed annular ring conduit, of a structurally strong material such as steel, surrounding said wall and having an exterior annular ring base overlying said mounting base and at least one ring bore aligned with the bore of said wall.

2. A construction, according to claim 1, wherein said ring conduit is formed of a radial inner ring portion and a radial outer ring portion.

3. A construction for a combustion chamber having a fluid cooled wall, comprising a combustion chamber wall having a cooling duct defined therethrough and being made of a relatively soft material, said wall having an annular ring mounting base defined on the exterior thereof overlying said duct, at least one bore defined through said wall from the exterior mounting base into said duct, a ring conduit of a structurally strong material such as steel, surrounding said wall and having a ring base overlying said mounting base and at least one ring bore aligned with the bore of said wall, solder connecting said conduit to said combustion chamber wall, and a connecting tube extending through the ring bore and at least a portion of the bore of said wall, the solder connecting said connecting tube between said ring conduit and said combustion chamber wall.

4. A construction for a combustion chamber having a fluid cooled wall, comprising a combustion chamber wall having a cooling duct defined therethrough and being made of a relatively soft material, said wall having a ring mounting base defined on the exterior thereof overlying said duct, at least one bore defined through said wall from the exterior mounting base into said duct, a ring conduit of a structurally strong material such as steel, surrounding said wall and having a ring base overlying said mounting base and at least one ring bore aligned with the bore of said wall, said combustion chamber wall bore including a widened portion adjacent the exterior extending inwardly from said mounting base and being of the same diameter as the diameter of the bore through said ring, a connecting tube extending through the bore of said ring and into the widened bore portion within said wall, said tube having a play in respect to the wall surrounding said bore of said wall at the inner radial end and being connected liquid tight with said ring by calking at their outer radial end.

5. A construction for a combustion chamber having a fluid cooled wall, comprising a combustion chamber wall having a cooling duct defined therethrough and being made of a relatively soft material, said wall having a ring mounting base defined on the exterior thereof overlying said duct, at least one bore defined through said wall from the exterior mounting base into said duct, a ring conduit of a structurally strong material such as steel, surrounding said wall and having a ring base overlying said mounting base and at least one ring bore aligned with the bore of said wall, said wall having at least two bores spaced apart in a longitudinal direction and each communicating at their inner ends with said duct, said ring conduit having two bores being alignable with the respective bores of said wall, and a connecting tube extending through each of the bores of said ring conduit and into the corresponding bores of said wall.

6. A construction for a combustion chamber having a fluid cooled wall, comprising a combustion chamber wall having a cooling duct defined therethrough and being made of a relatively soft material, said wall having a ring mounting base defined on the exterior thereof overlying said duct, at least one bore defined through said wall from the exterior mounting base into said duct, a ring conduit of a structurally strong material such as steel, surrounding said wall and having a ring base overlying said mounting base and at least one ring bore aligned with the bore of said wall, ring conduit being made up of an inner radial part and an outer radial part, at least one connecting pipe connected into said outer radial part of said ring conduit, a connecting tube extending through the bore of said ring conduit and into at least a portion of the bore of said wall, and solder means connected between said ring conduit and said wall and securing said connecting tube in position.

* * * * *